(No Model.)

L. G. BRAGG.
TREE DIGGER.

No. 275,575. Patented Apr. 10, 1883.

Attest.
Ino. C. Perkins
J. L. Quer

Inventor:
Leonard G. Bragg
By Lucius C. West
Attorney

UNITED STATES PATENT OFFICE.

LEONARD G. BRAGG, OF KALAMAZOO, MICHIGAN.

TREE-DIGGER.

SPECIFICATION forming part of Letters Patent No. 275,575, dated April 10, 1883.

Application filed December 8, 1882. (No model.)

*To all whom it may concern:*

Be it known that I, LEONARD G. BRAGG, a citizen of the United States, residing at Kalamazoo, county of Kalamazoo, State of Michigan, have invented a new and useful Tree-Digger, of which the following is a specification.

My invention has for its object to construct an improved device designed especially for nurserymen's use in unearthing trees, shrubs, and the like, grown in rows.

The general construction of a device embodying my invention consists in a U-shaped blade adapted for cutting through the earth beneath and each side of the tree, provided with draft-beams, governing-wheels, and handles of peculiar construction and arrangement.

Figure 1:
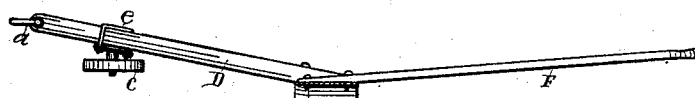
Figure 2:
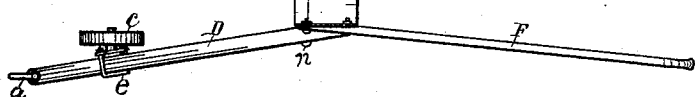
Figure 3:
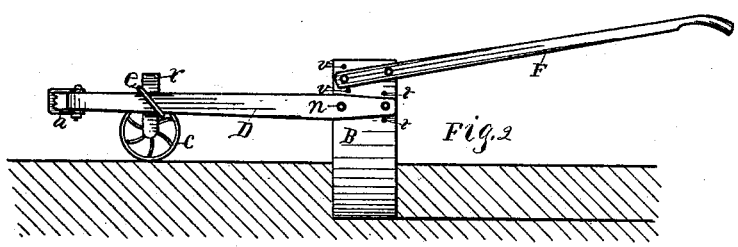
Figure 4:
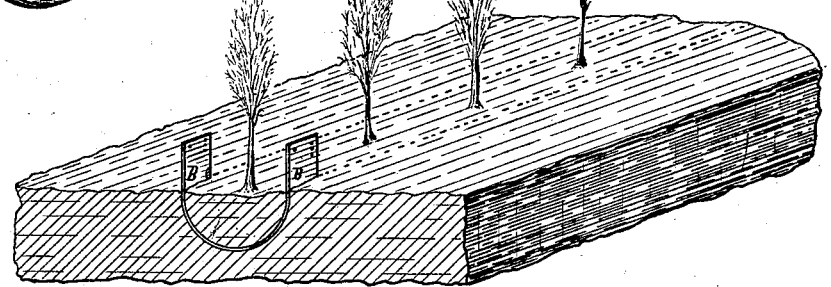

In the drawings forming a part of this specification, Figure 1 is a top view of the device complete; Fig. 2, a side elevation, with the ground in section; Fig. 3, a perspective view of the blade; and Fig. 4, a row of trees and the blade, showing its position in the ground during the operation.

B is the U-shaped blade, made from a strip of steel, perhaps five feet long and one foot wide, with two feet space between the two ends after bending. One edge is sharpened, Fig. 3. This blade runs in the soil, Fig. 4, cutting loose a strip of soil in which a row of trees grow. The objects of making the blade U form with a semicircular base are, that less power is required to draw it through the soil, it is easier made, and takes less material than any other shape practical to use. To the blade at the upper ends I secure draft-beams D D. They are of light tough timber, which will not bend out of shape under the strain of the draft power, as would metal beams which were light enough to be practical. The ends of beams D D, which are secured to the blade B, are beveled, as in Fig. 1, in order that said beams shall be straight and yet flare well apart at the outer end, where the clevis *a* is connected. By thus flaring these ends apart a narrow strip of soil may be cut, less steel used in the blade, and the whiffletrees, to which the horses are hitched, will not conflict with the trees; and a further and very important object is to keep the cutting-edge of the sides of the blade from being flared outward by the pressure of the soil, as the tendency of the draft power is to draw the clevis ends of the draft-beams together. If said beams were parallel with the line of draft or converged toward each other, the draft power would have the reverse tendency. These beams are pivoted to the upper ends of the blade B at *n*, and adjustably bolted in one of a series of holes, *t t*. By this means any desired vertical pitch may be given them in accordance with the draft power, depth of cut of the blade, &c.

*c c* are governing-wheels, something like the common plow-wheel, except that they are peculiarly constructed and adapted for this device. They are connected with the beams D D in a horizontally and vertically adjustable manner by clip *e*. The standard *r* of wheels *c* is set at an oblique angle, corresponding with the angle of the beam D, while the axle of the wheel itself is so set that said wheel will run parallel to the line of draft, Fig. 1. To attain the best results in balancing the device and governing the leverage of the draft power, the wheels should be set well toward the outer end of the beams D, so that the wheels will traverse a line parallel with the line of draft and intercepting the sides of the blade B, thus requiring no exertion of the operator to gage and govern the device.

The handles F F are made much longer than the beams D D, in order that the operator may easily overcome the leverage of the draft power by bearing down on them in running the blade out of the ground at the end of the row. The end of the handles secured to the blade is beveled and adjustably pivoted, the same as beams D D; but they need not flare apart at the outer end so far as the beams. By locating the adjusting-bolt in different holes of the series *v v* the pitch of the handles may be governed in accordance with the height of the operator, the depth of cut of the blade B, and the pitch of beams D D.

A device thus made of these simple parts adjustably combined together greatly facilitates the operation, is less expensive to make, and better results are attained in the work accomplished than by any other devices known to me.

In the operation only one operator is needed, and he may walk by the side of one of the handles, taking hold of the same, if necessary; but where the soil is free from stone the device will keep upright without any assistance.

Having thus described my invention, what I claim, and desire to secure by Letters Patent, is—

1. In a tree-digger, the combination of a U-shaped blade, handles, diverging draft-beams, and governing-wheels, substantially as described and shown.

2. In a tree-digger, the combination of the blade adapted to cut a semicircular strip of soil, handles, and diverging draft-beams, substantially as described.

3. In a tree-digger, the combination of a U-shaped blade, the handles, draft-beams flaring apart, as shown, and governing-wheels adapted to traverse the line stated, substantially as set forth.

LEONARD G. BRAGG.

Witnesses:
J. S. DUER,
I. L. WEST.